US 6,524,015 B1

(12) United States Patent
Cheng

(10) Patent No.: US 6,524,015 B1
(45) Date of Patent: Feb. 25, 2003

(54) ADAPTOR FOR AN OPTICAL CABLE TERMINAL

(76) Inventor: Yu-Feng Cheng, No. 7, Fuhsing St., Tucheng Ind. Dist., Tucheng City, Taipei Hsien (TW)

(*) Notice: Subject to any disclaimer, the term of this patent is extended or adjusted under 35 U.S.C. 154(b) by 89 days.

(21) Appl. No.: 09/612,764
(22) Filed: Jul. 10, 2000
(51) Int. Cl.$^7$ ................................................ G02B 6/36
(52) U.S. Cl. .................................... 385/76; 385/92
(58) Field of Search ............................ 385/76, 77, 78, 385/84, 86, 89, 92

(56) References Cited

U.S. PATENT DOCUMENTS

| 4,743,088 A | * | 5/1988 | Balyasny et al. ............ 385/136 |
| 4,813,760 A | * | 3/1989 | Tanaka et al. ................ 385/62 |
| 5,732,175 A | * | 3/1998 | Fan .............................. 385/66 |
| 6,058,230 A | * | 5/2000 | Ward ............................ 385/139 |
| 6,062,739 A | * | 5/2000 | Blake et al. ................... 385/56 |
| 6,179,482 B1 | * | 1/2001 | Takizawa et al. .............. 385/55 |

* cited by examiner

Primary Examiner—Lynn D. Feild
Assistant Examiner—Chandrika Prasad
(74) Attorney, Agent, or Firm—Alan Kamrath; Rider, Bennett, Egan & Arundel, LLP

(57) ABSTRACT

An adaptor for an optical cable terminal consists of an outer tube that contains an interior optical cable and is able to be used with a toslink socket provided in a household appliance, a clip contained in the outer tube, and an inner tube contained also in the outer tube. If a socket provided in a household appliance is for a 3.5 Φ optical cable terminal, the terminal can be inserted into the socket directly. However, if the socket is a toslink type, the terminal can be inserted into a central channel of the inner tube and then the adaptor can be inserted into the toslink. Therefore, with the adaptor of the invention, the 3.5 Φ terminal of an optical cable is able to be used with not only a 3.5 Φ socket but also with a toslink socket provided in a household appliance.

5 Claims, 4 Drawing Sheets

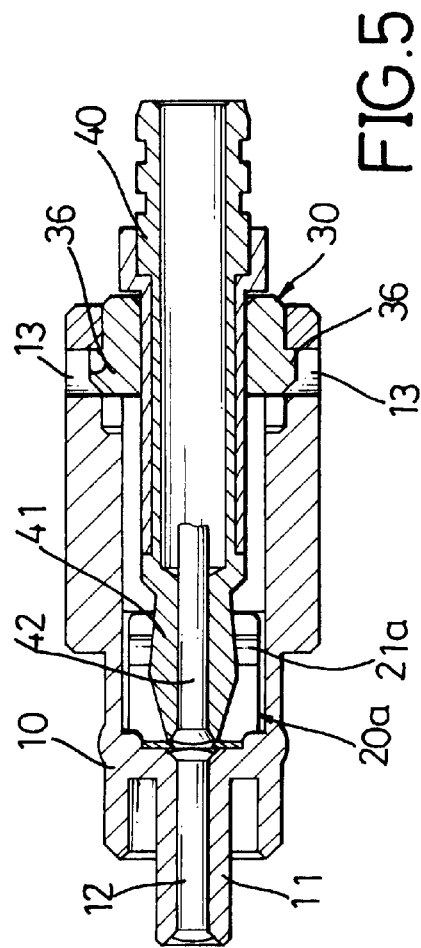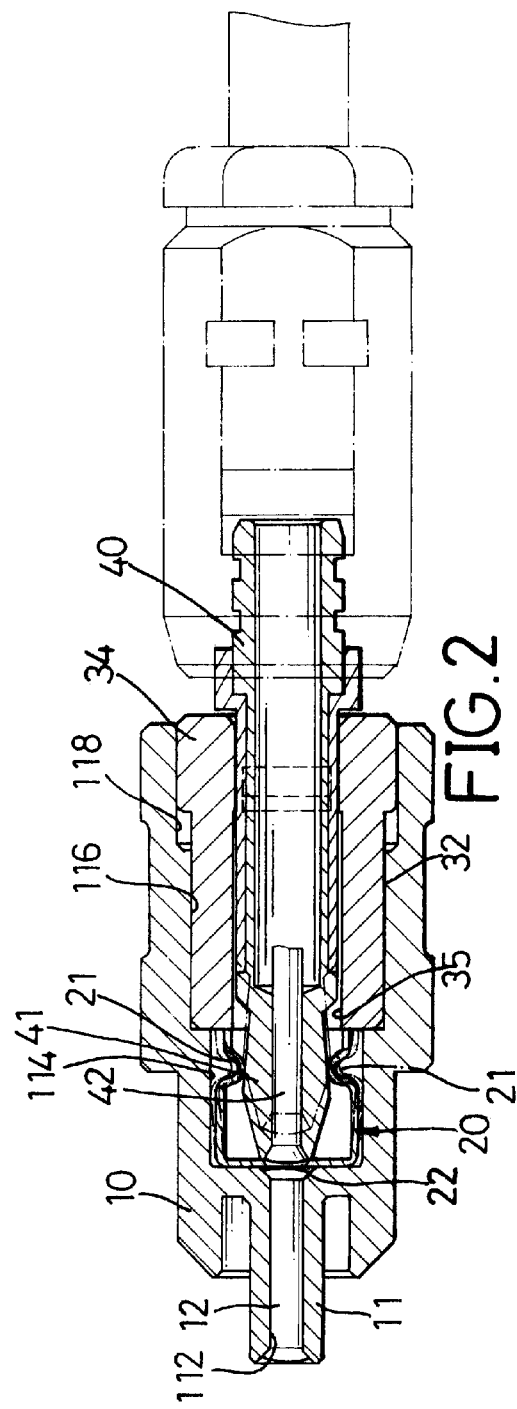

ADAPTOR FOR AN OPTICAL CABLE TERMINAL

BACKGROUND OF THE INVENTION

1. Field of the Invention

The invention relates to an adaptor for an optical cable terminal, especially for an adaptor which is able to allow a 3.5 Φ terminal of an optical cable to mate not only with a 3.5 Φ socket but also with a toslink socket provided in a household appliance.

2. Description of Related Art

Optical cables and related household appliances are becoming increasingly common in our homes since they have a large capacity and can provide high clarity pictures and sound. However at present there are two kinds of socket provided in the household appliances for optical cable terminals: the 3.5 Φ socket and the toslink socket. Therefore, trouble may arise if the optical cable terminal is 3.5 Φ but a household appliance only has a toslink socket.

SUMMARY OF THE INVENTION

The main object of the invention is to provide an adaptor for an optical cable terminal which can mate not only with a 3.5 socket but also with a toslink socket provided in a household appliance.

Other objects, advantages and novel features of the invention will become more apparent from the following detailed description when taken in conjunction with the accompanying drawings.

BRIEF DESCRIPTION OF THE DRAWINGS

FIG. 2 is a top cross sectional view of the embodiment shown in FIG. 1;

DETAILED DESCRIPTION OF THE PREFERRED EMBODIMENT

Figure 1:
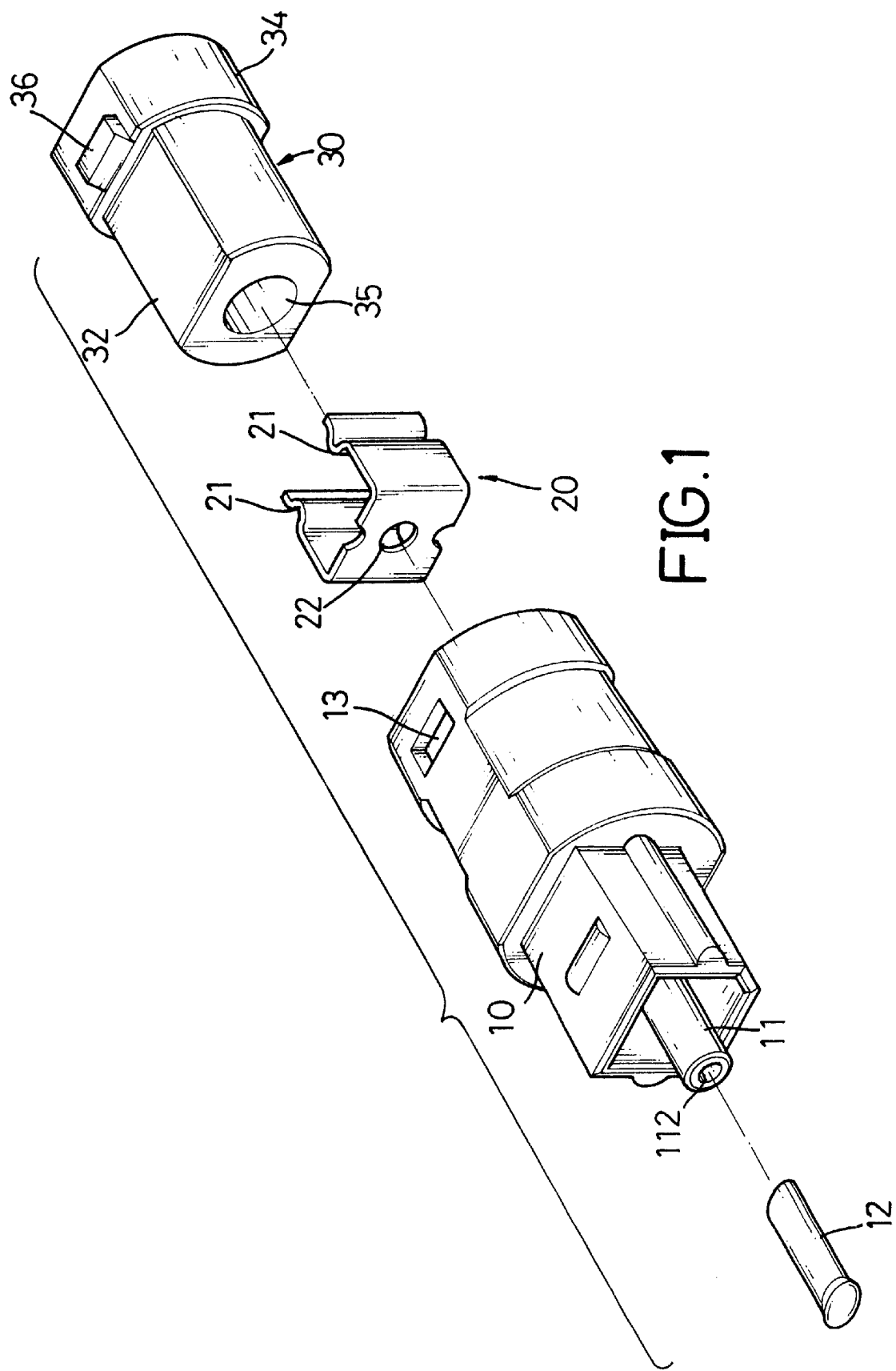
FIG. 1 is an exploded perspective view of the preferred embodiment of the invention.
Figure 3:
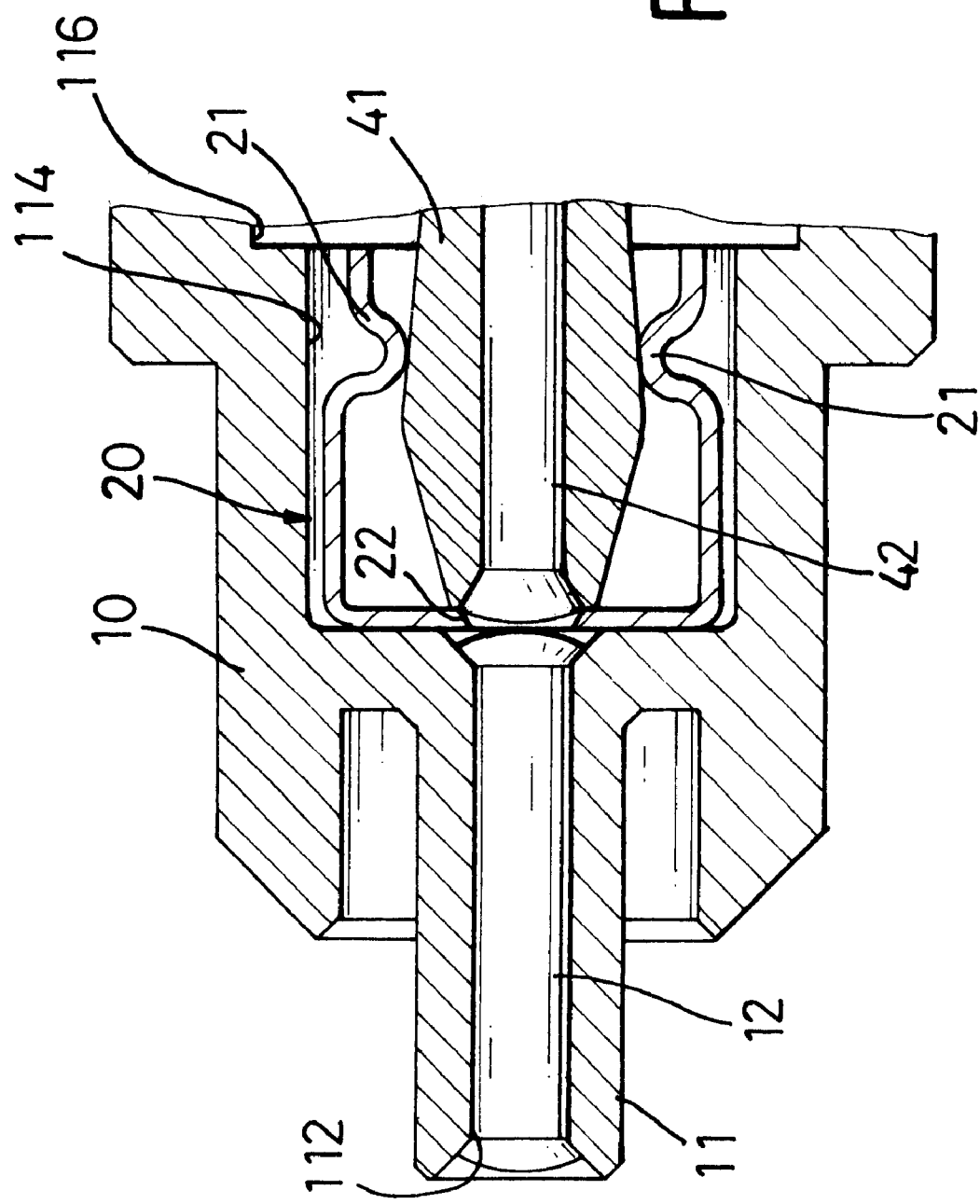
FIG. 3 is an enlarged cross sectional partial view of the embodiment shown in FIG. 1.

As shown in FIGS. 1, 2, and 3, the invention, an adaptor for an optical cable terminal, is made up of an outer tube (10), a clip (20), and an inner tube (30).

The outer tube (10) has a box-like front portion and a substantially cylindrical rear portion. The front portion includes a pipe (11) defining a bore (112). A first end of the pipe protrudes from the front portion and a second end of the pipe (11) terminates within the first portion. The second end of the pipe (11) has a countersunk exit in communication with the bore (112). A first counter bore (114), a second counter bore (116), and a third counter bore (118), each with a first end and a second end, sequentially extend through the outer tube (10), and the first end of the first counter bore (114) communicates with the countersunk exit the pipe (11), and the second end of the third counter bore (118) opens to an exterior of the rear portion of the outer tube (10). Two openings (13) are oppositely defined in the rear portion of the outer tube (10), and communicate the third counter bore (118) with an outer periphery of the rear portion. The bore (112) is sized to receive an interior optical cable (12) therethrough. The front portion of the outer tube (10) is configured to mate with a toslink socket (not shown), which includes a bore sized to receive the pipe (11) and a counterbore dimensioned to receive the outer tube (10) of a toslink terminal.

The clip (20) is made of an elastic material and is substantially "U"-shaped, having an end plate with a front face and a rear face, and two arms integrally extending in a same direction from the rear face. As shown in FIG. 3, the clip (20) is sized to be snugly received in the first counter bore (114), such that the end plate can abut a junction between the bore (112) and the first counter bore (114), and distal edges of the arms align with a junction between the first and second counter bores (114, 116). A central bevel hole (22) is defined in the end plate, and tapers inwardly from the rear face to the front face. A portion of each of the two arms is curved inwardly to form a pair of opposite nibs (21).

Referring to FIGS. 1 and 2, the inner tube (30) has a body (32) at the front and a shoulder (34) at the back. The body (32) is sized to be slidingly received within the second and third counter bores (116, 118). In this embodiment, the body (32) of the inner tube (30) and the second counter bore (116) each have two opposed arcuate walls and two flat walls extending respectively between the arcuate walls, whereby the inner tube (30) will not rotate within the outer tube (10) when fitted thereto. The shoulder (34) is configured to be received within the third counter bore (118), and has two opposed side protrusions (36) extending from a periphery of the shoulder (34). A distance from a tip of one of the side protrusions (36) to the tip of the other is nominally greater than a distance between outer terminal points of the openings (13). The side protrusions (36) are sized to be respectively receivable in the openings (13). The inner tube (30) further has a central channel (35) extending from a front face to a rear face thereof.

In assembly, referring to FIGS. 2 and 3, the clip (20) is fitted in the first counter bore (114) such that the front face of the end plate abuts the junction between the bore (112) and the counter bore (114). If a socket provided in a household appliance is for a 3.5 Φ terminal (40), the 3.5 Φ terminal (40) including an exterior optical cable (42) can be directly inserted therein. However, if the socket is a toslink type, with reference to FIGS. 2 and 3, the 3.5 Φ terminal (40) is first inserted in the central channel (35) via the back of the inner tube (30) until a bulbous head (41) of the terminal (40) protrudes from the front of the inner tube (30). As particularly shown in FIG. 3, the bulbous head (41) extends through the nibs (21) to be releasably retained thereby. An arcuate tip of the exterior optical cable (42) meets the bevel hole (22), and an arcuate tip of the interior optical cable (12) meets the counter sunk exit of the pipe (11), such that the interior and exterior optical cables (12, 42) are retained at a specific distance from each other to allow normal optical cable transmission therebetween. The shoulder (34) and side protrusions (36) are deformable to enter the third counter bore (118) and once therein, return to their pre-deformed state such that the side protrusions (36) extend through the respective opening (13), whereby the inner tube (30) is securely retained in the outer tube (10).

Figure 4:
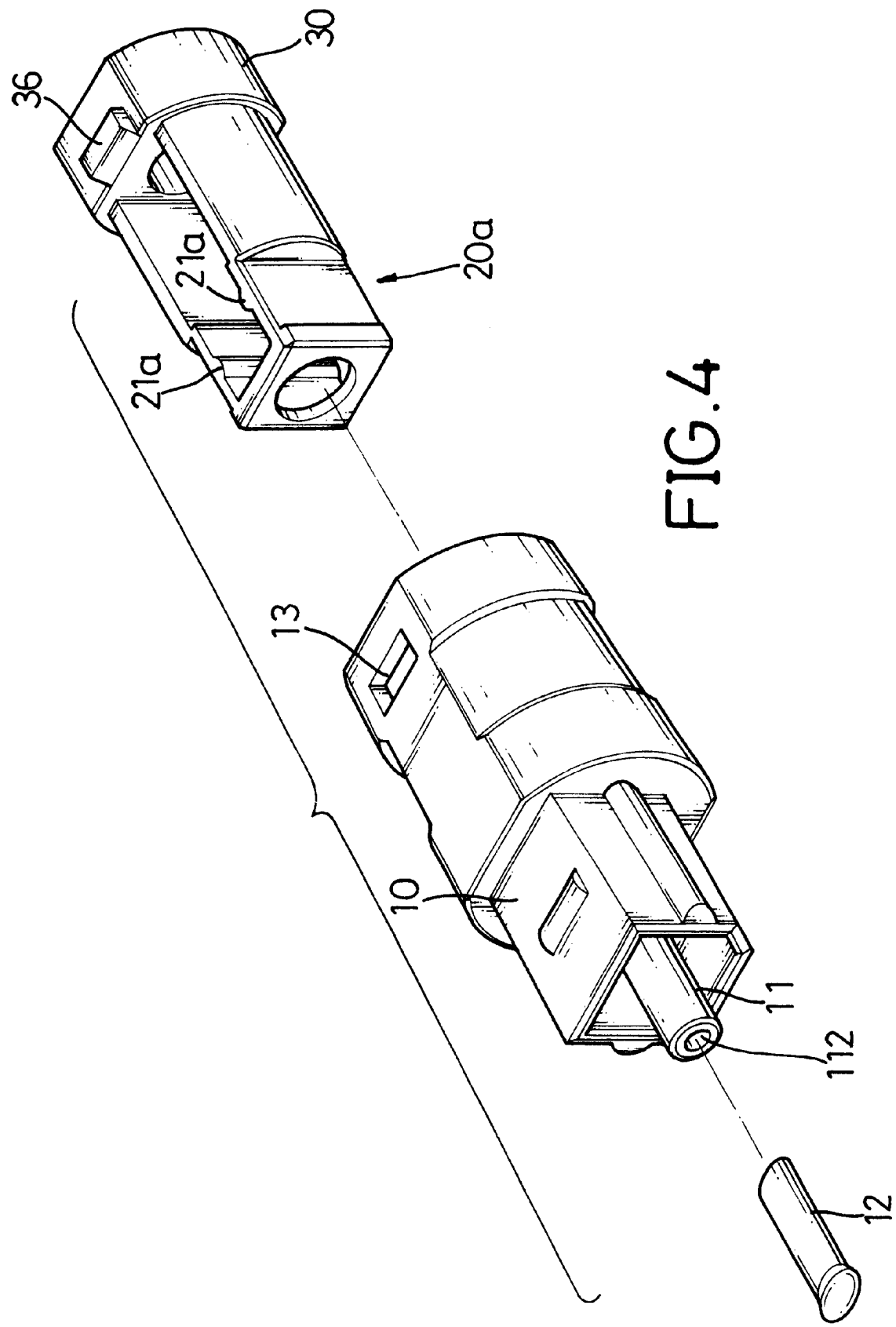
FIG. 4 is an exploded perspective view of another embodiment of the invention; and, FIG. 5 is a top cross sectional view of the embodiment shown in FIG. 4.

Shown in FIGS. 4 and 5 is another embodiment of the invention. In this embodiment, the clip (20a) with nibs (21a) is formed integrally with the pair of arms thereof being formed on the inner tube (30).

From above description, it could be understood that with the adaptor of the invention, the 3.5 Φ terminal of an optical cable is able to be used with not only a 3.5 Φ socket but also with a toslink socket provided in a household appliance.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adaptor for an optical cable terminal comprising:

an outer tube (10) having a first end containing a pipe (11) with a bore (112) for receiving an interior optical cable (12) therein and detachably engageable with a toslink socket, a second end defining an opening, a passage extending between the pipe and the opening;

a resilient clip (20) received in the passage of the outer tube and having an end plate and a pair of integral arms extending in a same direction from the end wall, each arm having a portion curved inwardly to form a pair of nibs (21), and the end plate having a central bevel hole (22); and an inner tube (30) detachably received in the passage of the outer tube (10) and abutting the clip (20) fitted therein, and having a central channel (35) receiving therethrough an exterior optical cable (42) with a terminal (40), whereby the exterior optical cable (42) has a distal tip thereof retained in the central bevel hole and at a proximity to a distal tip of the interior optical cable (12).

2. The adaptor for an optical cable terminal as claimed in claim 1, wherein a pair of side openings (13) is defined in a wall of the outer tube (10) and a pair of corresponding elastic side protrusions (36) is formed on a wall of the inner tube (30) whereby when the inner tube (30) is inserted in the outer tube (10), the pair of protrusions (36) respectively enter the pair of openings (13) to longitudinally fix the inner and the outer tube (30, 10) together.

3. The adaptor for an optical cable terminal as claimed in claim 1, wherein the clip (20) is formed integrally with said pair of arms thereof being formed on the inner tube (30).

4. The adaptor for an optical cable terminal as claimed in claim 1, wherein the passage of the outer tube (10) comprises a first counter bore (114), a second counter bore (116), and a third counter bore (118), wherein the clip (20) is received in the first counter bore (114), and the inner tube (30) is received in the second and third counter bores (116, 118).

5. The adaptor for an optical cable terminal as claimed in claim 1, wherein the pipe (11) has a counter sunk exit at a junction between the bore (112) and the first counter bore (114) to receive the distal tip of the interior optical cable (12).

* * * * *